US010336918B2

(12) United States Patent
Sakamoto et al.

(10) Patent No.: US 10,336,918 B2
(45) Date of Patent: Jul. 2, 2019

(54) ADHESIVE COMPOSITION

(71) Applicant: ZEON CORPORATION, Tokyo (JP)

(72) Inventors: Masato Sakamoto, Tokyo (JP); Tomonori Nakashima, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 325 days.

(21) Appl. No.: 14/419,023

(22) PCT Filed: Aug. 28, 2013

(86) PCT No.: PCT/JP2013/072952
§ 371 (c)(1),
(2) Date: Feb. 2, 2015

(87) PCT Pub. No.: WO2014/034698
PCT Pub. Date: Mar. 6, 2014

(65) Prior Publication Data
US 2015/0225618 A1    Aug. 13, 2015

(30) Foreign Application Priority Data

Aug. 31, 2012 (JP) .................. 2012-190944

(51) Int. Cl.
| C09J 109/04 | (2006.01) |
| C09J 133/18 | (2006.01) |
| C08J 5/12 | (2006.01) |
| C08F 220/42 | (2006.01) |
| C09J 4/06 | (2006.01) |
| B32B 7/12 | (2006.01) |
| B32B 25/10 | (2006.01) |
| B32B 25/16 | (2006.01) |
| C09J 115/00 | (2006.01) |
| C08F 220/46 | (2006.01) |
| C08F 218/14 | (2006.01) |
| C09J 109/02 | (2006.01) |
| C09J 113/02 | (2006.01) |
| C08F 220/44 | (2006.01) |
| C08F 218/16 | (2006.01) |

(52) U.S. Cl.
CPC .............. *C09J 109/04* (2013.01); *B32B 7/12* (2013.01); *B32B 25/10* (2013.01); *B32B 25/16* (2013.01); *C08F 220/42* (2013.01); *C08J 5/124* (2013.01); *C09J 4/06* (2013.01); *C09J 115/005* (2013.01); *C09J 133/18* (2013.01); B32B 2307/306 (2013.01); B32B 2307/54 (2013.01); B32B 2307/554 (2013.01); B32B 2307/584 (2013.01); B32B 2307/7265 (2013.01); B32B 2413/00 (2013.01); C08F 218/14 (2013.01); C08F 218/16 (2013.01); C08F 220/44 (2013.01); C08F 220/46 (2013.01); C09J 109/02 (2013.01); C09J 113/02 (2013.01); Y10T 428/31924 (2015.04)

(58) Field of Classification Search
CPC .... C09J 109/04; C09J 109/02; C09J 115/005; C09J 113/02; C08F 220/42; C08F 220/44; C08F 220/46; C08F 218/14; C08F 218/16
See application file for complete search history.

(56) References Cited

U.S. PATENT DOCUMENTS

| 5,298,542 A * | 3/1994 | Nakamura | ........... C08K 5/0016 523/201 |
| 6,657,014 B1 | 12/2003 | Mori et al. | |
| 2005/0113527 A1* | 5/2005 | Perrella | ..................... C08K 5/17 525/310 |
| 2006/0234044 A1 | 10/2006 | Nakanishi et al. | |
| 2006/0235158 A1* | 10/2006 | Ota | ....................... B29C 41/003 525/212 |
| 2009/0186977 A1* | 7/2009 | Nagamori | ................. C08K 3/36 524/556 |
| 2010/0236716 A1 | 9/2010 | Hisha et al. | |
| 2010/0256294 A1* | 10/2010 | Ikeda | ....................... C08K 5/18 524/559 |
| 2011/0301300 A1* | 12/2011 | Iizuka | ..................... C08C 19/02 525/328.9 |
| 2012/0130005 A1* | 5/2012 | Senda | ................... C08F 220/42 524/511 |
| 2014/0206250 A1* | 7/2014 | Nakashima | .............. C09J 11/06 442/71 |
| 2014/0323658 A1 | 10/2014 | Sakamoto et al. | |

FOREIGN PATENT DOCUMENTS

| CN | 1847351 A | 10/2006 |
| CN | 101802119 A | 8/2010 |
| CN | 102471420 A | 5/2012 |
| EP | 2 239 297 A1 | 10/2010 |

(Continued)

OTHER PUBLICATIONS

Dec. 10, 2013 International Search Report issued in International Application No. PCT/JP2013/072952.
Mar. 16, 2016 Extended Search Report issued in European Patent Application No. 13832375.3.
Office Action dated Mar. 13, 2017 in European Application No. 13832375.3.

Primary Examiner — Ling Siu Choi
Assistant Examiner — David L Miller
(74) Attorney, Agent, or Firm — Oliff PLC

(57) ABSTRACT

An adhesive composition containing a latex of a highly saturated nitrile rubber (A) which has $\alpha,\beta$-ethylenically unsaturated nitrile monomer units 10 to 55 wt %, conjugated diene monomer units 25 to 89 wt %, and $\alpha,\beta$-ethylenically unsaturated dicarboxylic acid monoester monomer units 1 to 20 wt % and has an iodine value of 120 or less and a polyvalent amine compound (B).

5 Claims, No Drawings

(56) References Cited

FOREIGN PATENT DOCUMENTS

| EP | 2 392 599 A1 | 12/2011 | | |
|---|---|---|---|---|
| EP | 2 781 547 A1 | 9/2014 | | |
| JP | S62-263271 A | 11/1987 | | |
| JP | S63-234075 A | 9/1988 | | |
| JP | H05-39364 A | 2/1993 | | |
| JP | H06-286015 A | 10/1994 | | |
| JP | H07-35500 B2 | 4/1995 | | |
| JP | H11-124559 A | 5/1999 | | |
| JP | 2001-055471 A | 2/2001 | | |
| JP | 2006-169446 A | 6/2006 | | |
| JP | 2006-328114 A | 12/2006 | | |
| WO | 2013/031801 A1 | 3/2013 | | |
| WO | WO-2013031801 A1 * | 3/2013 | .............. | C09J 11/06 |

* cited by examiner

0
ADHESIVE COMPOSITION

TECHNICAL FIELD

The present invention relates to an adhesive composition which contains a latex of highly saturated nitrile rubber.

BACKGROUND ART

Composites of rubber and fiber are used for belts, rubber hoses, diaphragms, and numerous other fields. In the field of belts, there are timing belts for automobile use, poly ribbed belts, lapped belts, V-belts, etc. Usually, they are comprised of woven fabric-shaped base fabrics and rubber. For example, in V-belts, the belts are surrounded by canvas for protection, while in toothed belts, the tooth parts have covering fabric laminated over them.

As the rubber, in the past, the oil resistant rubber of chloroprene rubber or acrylonitrile-butadiene copolymer rubber had mainly been used, but in recent years, to deal with automotive emission regulations, the smaller engine compartments for lightening the weight of automobiles, the closed engine compartments for reducing noise, etc., heat resistance is demanded. For this reason, highly saturated nitrile rubber provided with both heat resistance and oil resistance has come to be used.

In this regard, if using a timing belt as an example, the tooth parts are protected by nylon base fabric, but to raise the bonding force between rubber and the base fabric and to suppress the abrasion due to engagement between the belt and gear, in general, the base fabric has been treated by a solvent-based rubber glue. However, recently, to eliminate environmental pollution due to organic solvents, art for treatment by an aqueous binder which takes the place of treatment by a solvent-based rubber glue has been desired.

As such art for treatment by an aqueous binder, Patent Document 1 discloses an adhesive composition which contains a carboxyl group-containing highly saturated nitrile rubber latex and resorcinol formaldehyde resin. However, along with the higher performance in engine compartments in automobiles, the demands on the materials have become increasingly severe. Further, adhesive compositions which can form adhesive layers which are excellent in mechanical strength, abrasion resistance, and waterproofness have been sought.

PRIOR ART DOCUMENTS

Patent Documents

Patent Document 1: Japanese Patent Publication No. 6-286015A

DISCLOSURE OF THE INVENTION

Problem to be Solved by the Invention

An object of the present invention is to provide an adhesive composition which can form an adhesive layer which is excellent in mechanical strength, abrasion resistance, and waterproofness.

Means for Solving the Problems

The inventors engaged in intensive research to solve the above problem and as a result discovered that the above object is achieved by using an adhesive composition which contains a latex of highly saturated nitrile rubber which contains specific monomer units in specific amounts and a polyvalent amine compound and thereby completed the present invention.

That is, according to the present invention, there is provided an adhesive composition containing a latex of a highly saturated nitrile rubber (A) which has $\alpha,\beta$-ethylenically unsaturated nitrile monomer units 10 to 55 wt %, conjugated diene monomer units 25 to 89 wt %, and $\alpha,\beta$-ethylenically unsaturated dicarboxylic acid monoester monomer units 1 to 20 wt % and has an iodine value of 120 or less and a polyvalent amine compound (B).

In the present invention, the $\alpha,\beta$-ethylenically unsaturated dicarboxylic acid monoester monomer units are preferably $\alpha,\beta$-ethylenically unsaturated dicarboxylic acid monoalkyl ester monomer units, more preferably mono-n-butyl maleate units.

In the present invention, a ratio of content of the polyvalent amine compound (B) is preferably 0.001 to 100 parts by weight with respect to 100 parts by weight of the highly saturated nitrile rubber (A).

Further, the polyvalent amine compound (B) used in the present invention is preferably polyethyleneimine, and the polyethyleneimine preferably has a weight average molecular weight (Mw) of 100 to 1,000,000.

Furthermore, according to the present invention, there is provided a fiber base material-highly saturated nitrile rubber composite obtained by bonding a fiber base material and highly saturated nitrile rubber with each other by the above adhesive composition.

Effects of the Invention

According to the present invention, there is provided an adhesive composition which can form an adhesive layer which is excellent in mechanical strength, abrasion resistance, and waterproofness.

DESCRIPTION OF EMBODIMENTS

The adhesive composition of the present invention contains a latex of highly saturated nitrile rubber (A) which has $\alpha,\beta$-ethylenically unsaturated nitrile monomer units 10 to 55 wt %, conjugated diene monomer units 25 to 89 wt %, and $\alpha,\beta$-ethylenically unsaturated dicarboxylic acid monoester monomer units 1 to 20 wt % and has an iodine value of 120 or less and a polyvalent amine compound (B).

Highly Saturated Nitrile Rubber (A)

The highly saturated nitrile rubber (A) used in the present invention is rubber which is obtained through a step of copolymerizing an $\alpha,\beta$-ethylenically unsaturated nitrile monomer, conjugated diene monomer, $\alpha,\beta$-ethylenically unsaturated dicarboxylic acid monoester monomer, and in accordance with need other monomers which can copolymerize with the above monomers and has an iodine value of 120 or less.

The $\alpha,\beta$-ethylenically unsaturated nitrile monomer is not particularly limited so long as an $\alpha,\beta$-ethylenically unsaturated compound which has a nitrile group. For example, acrylonitrile; $\alpha$-chloroacrylonitrile, $\alpha$-bromoacrylonitrile, and other $\alpha$-halogenoacrylonitriles; methacrylonitrile and other $\alpha$-alkylacrylonitriles; etc. may be mentioned. Among these as well, acrylonitrile and methacrylonitrile are preferable, while acrylonitrile is particularly preferable. $\alpha,\beta$-ethylenically unsaturated nitrile monomers may be used as single type alone or as a plurality of types combined.

The content of the α,β-ethylenically unsaturated nitrile monomer units is 10 to 55 wt % with respect to the total monomer units which form the highly saturated nitrile rubber (A), preferably 20 to 53 wt %, furthermore preferably 25 to 50 wt %. If the content of the α,β-ethylenically unsaturated nitrile monomer units is too small, the obtained cured adhesive layer (the layer of the cured adhesive composition which is formed after bonding by using the adhesive composition of the present invention) is liable to fall in oil resistance, while conversely if too great, the cold resistance may fall.

The conjugated diene monomer is not particularly limited, but 1,3-butadiene, isoprene, 2,3-dimethyl-1,3-butadiene, 1,3-pentadiene, and other conjugated diene monomers which have 4 to 6 carbon atoms, 1,3-butadiene and isoprene is more preferable, and 1,3-butadiene is particularly preferable. The conjugated diene monomers may be used as single type alone or as a plurality of types combined.

The content of the conjugated diene monomer units is 25 to 89 wt % with respect to the total monomer units which form the highly saturated nitrile rubber (A), preferably 32 to 78 wt %, furthermore preferably 40 to 73 wt %. If the content of the conjugated diene monomer units is too small, the obtained cured adhesive layer is liable to fall in flexibility, while conversely if too great, the heat resistance and the chemical resistance stability may be impaired. Note that, the content of the above conjugated diene monomer units is the content including the hydrogenated parts when performing the later explained hydrogenation of the copolymer.

As the α,β-ethylenically unsaturated dicarboxylic acid monoester monomer, monomethyl maleate, monoethyl maleate, monopropyl maleate, mono-n-butyl maleate, monomethyl fumarate, monoethyl fumarate, monopropyl fumarate, mono n-butyl fumarate, monomethyl itaconate, monoethyl itaconate, monopropyl itaconate, mono n-butyl itaconate, monomethyl citraconate, monoethyl citraconate, monopropyl citraconate, mono n-butyl citraconate, and other α,β-ethylenically unsaturated dicarboxylic acid monoalkyl ester monomers; monocyclopentyl maleate, monocyclohexyl maleate, monocycloheptyl maleate, monocyclopentyl fumarate, monocyclohexyl fumarate, monocycloheptyl fumarate, monocyclopentyl itaconate, monocyclohexyl itaconate, monocycloheptyl itaconate, monocyclopentyl citraconate, monocyclohexyl citraconate, monocycloheptyl citraconate, and other α,β-ethylenically unsaturated dicarboxylic acid monocycloalkyl ester monomers; monomethylcyclopentyl maleate, monoethylcyclohexyl maleate, monomethylcyclopentyl fumarate, monoethylcyclohexyl fumarate, monomethylcyclopentyl itaconate, monoethylcyclohexyl itaconate, monomethylcyclopentyl citraconate, monoethylcyclohexyl citraconate, and other α,β-ethylenically unsaturated dicarboxylic acid monoalkylcycloalkyl ester monomers; mono 2-hydroxyethyl maleate, mono 3-hydroxypropyl maleate, mono 2-hydroxyethyl fumarate, mono 2-hydroxypropyl fumarate, mono 2-hydroxyethyl itaconate, mono 3-hydroxypropyl itaconate, mono 2-hydroxyethyl citraconate, and other α,β-ethylenically unsaturated dicarboxylic acid monohydroxyalkyl ester monomers; monocyclohexenyl maleate, monocyclohexenyl fumarate, and other α,β-ethylenically unsaturated dicarboxylic acid monoester monomers which have alicyclic structures; etc. may be mentioned, but since the effect of the present invention becomes much more remarkable, an α,β-ethylenically unsaturated dicarboxylic acid monoalkyl ester monomer is preferable, a maleic acid monoalkyl ester is more preferable, and mono n-butyl maleate is particularly preferable. Note that, the number of carbon atoms of the alkyl groups of the above alkyl esters is preferably 2 to 8.

The content of the α,β-ethylenically unsaturated dicarboxylic acid monoester monomer units is 1 to 20 wt % with respect to the total monomer units, preferably 2 to 15 wt %, more preferably 2 to 10 wt %. If the content of the α,β-ethylenically unsaturated dicarboxylic acid monoester monomer units is in the above range, an adhesive composition which can form an adhesive layer which is excellent in mechanical strength, abrasion resistance, and waterproofness is easily obtained.

Further, the highly saturated nitrile rubber (A) used in the present invention may be one which is obtained by copolymerizing, within a range not detracting from the effect of the present invention, in addition to the α,β-ethylenically unsaturated nitrile monomer, conjugated diene monomer, and α,β-ethylenically unsaturated dicarboxylic acid monoester monomer, other monomers which can copolymerize with the same.

As such other monomers, ethylene, an α-olefin monomer, aromatic vinyl monomer, a carboxyl group-containing monomer other than an α,β-ethylenically unsaturated dicarboxylic acid monoester monomer (including an anhydride of polyvalent carboxylic acid), an α,β-ethylenically unsaturated carboxylic acid ester monomer (one not having non-esterified, unsubstituted (free) carboxyl group), a fluorine-containing vinyl monomer, copolymerizable antiaging agent, etc. may be illustrated.

As the α-olefin monomer, one which has 3 to 12 carbon atoms is preferable, for example, propylene, 1-butene, 4-methyl-1-pentene, 1-hexene, 1-octene, etc. may be mentioned.

As the aromatic vinyl monomer, for example, styrene, α-methylstyrene, vinyl pyridine, etc. may be mentioned.

As the carboxyl group-containing monomer other than an α,β-ethylenically unsaturated dicarboxylic acid monoester monomer (including anhydrides of polyvalent carboxylic acids), acrylic acid, methacrylic acid, ethylacrylic acid, crotonic acid, cinnamic acid, and other α,β-ethylenically unsaturated monocarboxylic acid monomers; fumaric acid, maleic acid, itaconic acid, citraconic acid, mesaconic acid, glutaconic acid, allylmalonic acid, tetraconic acid, and other α,β-ethylenically unsaturated polyvalent carboxylic acids; maleic acid anhydride, itaconic acid anhydride, citraconic acid anhydride, and other anhydrides of α,β-unsaturated polyvalent carboxylic acids; etc. may be mentioned.

As the α,β-ethylenically unsaturated carboxylic acid ester monomer (one not having non-esterified, unsubstituted (free) carboxyl group), for example, methyl acrylate, ethyl acrylate, n-butyl acrylate, n-dodecyl acrylate, methyl methacrylate, ethyl methacrylate, and other (meth)acrylic acid esters (abbreviation of "methacrylic acid ester and acrylic acid ester", same below) which have an alkyl group with 1 to 18 carbon atoms; methoxymethyl acrylate, 2-methoxyethyl acrylate, 2-methoxyethyl methacrylate, and other (meth)acrylic acid esters which have an alkoxyalkyl group with 2 to 12 carbon atoms; α-cyanoethyl acrylate, α-cyanoethyl methacrylate, α-cyanobutyl methacrylate, and other (meth)acrylic acid esters which have a cyanoalkyl group with 2 to 12 carbon atoms; 2-hydroxyethyl acrylate, 2-hydroxypropyl acrylate, 2-hydroxyethyl methacrylate, and other (meth)acrylic acid esters which have a hydroxyalkyl group with 1 to 12 carbon atoms; trifluoroethyl acrylate, tetrafluoropropyl methacrylate, and other (meth)acrylic acid esters which have fluoroalkyl group with 1 to 12 carbon atoms; dimethyl maleate, dimethyl fumarate, dimethyl itaconate, diethyl itaconate, and other α,β-ethylenically unsaturated dicarboxylic acid dialkyl esters; dimethylaminomethyl acrylate, diethylaminoethyl acrylate, and other dialkylamino group-containing α,β-ethylenically unsaturated carboxylic acid esters; etc. may be mentioned.

As the fluorine-containing vinyl monomer, for example, fluoroethylvinyl ether, fluoropropylvinyl ether, o-trifluoromethylstyrene, vinyl pentafluorobenzoate, difluoroethylene, tetrafluoroethylene, etc. may be mentioned.

As the copolymerizable antiaging agent, for example, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinyl benzyloxy)aniline, benzyloxy)aniline, etc. may be mentioned.

These copolymerizable other monomers may be jointly used in pluralities of types. The content of the units of the other monomers is preferably 40 wt % or less with respect to the total monomer units, more preferably 30 wt % or less, furthermore preferably 10 wt % or less.

The highly saturated nitrile rubber (A) had an iodine value of 120 or less, preferably 60 or less, particularly preferably 30 or less. If the highly saturated nitrile rubber (A) has too high an iodine value, the obtained cured adhesive layer is liable to fall in heat resistance and ozone resistance.

The highly saturated nitrile rubber (A) has a polymer Mooney viscosity ($ML_{1+4}$, 100° C.) of preferably 15 to 250, more preferably 20 to 200, particularly preferably 30 to 150. If the highly saturated nitrile rubber (A) has a polymer Mooney viscosity which is too low, the obtained cured adhesive layer is liable to fall in mechanical strength, while conversely if too high, the bondability is liable to fall.

The latex of the highly saturated nitrile rubber (A) used for the adhesive composition of the present invention is obtained by copolymerizing the above-mentioned monomers and, in accordance with need, treating the obtained copolymer (X) (below, sometimes simply called the "nitrile rubber") by a conventionally known method to hydrogenate the carbon-carbon double bonds in it and further, in accordance with need, emulsifying it.

The polymerization method is not particularly limited and may be based on any known polymerization method, but from the viewpoint of industrial productivity, the emulsion polymerization method is preferable.

As the specific method in the case of hydrogenation, (i) the method of hydrogenating a copolymer (X) in the latex state by using gaseous hydrogen, (ii) the method of adding hydrogen atoms to a copolymer (X) in the latex state by using hydrazine or another reducing agent, (iii) the method of coagulating and drying a copolymer (X) in the latex state to separate it, then dissolving it in an organic solvent, hydrogenating the dissolved copolymer (X), then converting it to a latex state by the phase transfer emulsification method, etc. may be mentioned, but from the viewpoint of improvement of the productivity, the above method (i) is preferable.

As the emulsion polymerization method, the conventionally known method may be employed.

The emulsifier which is used for the polymerization is usually an anionic surfactant, cationic surfactant, nonionic surfactant, amphoteric surfactant, etc. Among these as well, an anionic surfactant is preferable. The amount of use is not particularly limited, but from the viewpoint of the bonding force of the adhesive composition which obtained from this latex, it is 1 to 10 parts by weight with respect to 100 parts by weight of the total monomer, preferably 2 to 6 parts by weight in range. Further, the polymerization initiator etc. also may be ones which are usually used.

Further, the polymerization system is not particularly limited. Any of the batch system, semi-batch system, and continuous system may be used. The polymerization temperature and the pressure are also not limited.

Note that, when the amount of the carbon-carbon double bonds in the copolymer (X) (ones derived from conjugated diene monomer units) is small and for that reason the nitrile rubber which is obtained by emulsion polymerization has an iodine value of the desired value or less, hydrogenation need not necessarily be performed.

In the method of the above (i), it is preferable to, if necessary, add water to the latex of the copolymer (X) which is prepared by emulsion polymerization so as to dilute the same and supply hydrogen in the presence of a hydrogenation catalyst so as to perform a hydrogenation reaction.

The hydrogenation catalyst is not particularly limited so long as a compound which is hard to break down in water.

As specific examples, as a palladium catalyst, a palladium salt of formic acid, propionic acid, lauric acid, succinic acid, oleic acid, phthalic acid, or other carboxylic acid; palladium chloride, dichloro(cyclooctadiene)palladium, dichloro(norbornadiene)palladium, ammonium hexachloropalladate (IV), or other palladium chlorides; palladium iodide or other iodides; palladium sulfate-dihydrate etc. may be mentioned.

Among these as well, a palladium salt of carboxylic acid, dichloro(norbornadiene)palladium, and ammonium hexachloropalladate (IV) are particularly preferable.

The amount of use of the hydrogenation catalyst may be suitably determined, but is preferably 5 to 6,000 wt ppm with respect to the copolymer (X), more preferably 10 to 4,000 wt ppm.

The reaction temperature of the hydrogenation reaction is preferably 0 to 300° C., more preferably 20 to 150° C., particularly preferably 30 to 100° C.

If the reaction temperature is too low, the reaction speed is liable to fall, while conversely if too high, hydrogenation of the nitrile groups or another secondary reaction may occur.

The hydrogen pressure is preferably 0.1 to 30 MPa, more preferably 0.5 to 20 mPa. Further, the reaction time is preferably 1 to 15 hours, particularly preferably 2 to 10 hours.

The thus obtained latex of the highly saturated nitrile rubber (A) has an average particle size of preferably 0.01 to 0.5 μm. Further, the latex preferably has a solid content concentration to prevent aggregation of 65 wt % or less, particularly preferably 5 to 60 wt %.

The adhesive composition of the present invention contains a latex of the highly saturated nitrile rubber (A).

The content of the highly saturated nitrile rubber (A) in the adhesive composition of the present invention is preferably 5 to 60 wt %, particularly preferably 10 to 50 wt %.

Polyvalent Amine Compound (B)

The adhesive composition of the present invention contains the polyvalent amine compound (B) in addition to the above-mentioned highly saturated nitrile rubber (A). The polyvalent amine compound (B) acts as a cross-linking agent for causing the above-mentioned highly saturated nitrile rubber (A) to cross-link.

The polyvalent amine compound (B) is not particularly limited so long as a compound having two or more amino groups or one becoming a compound having two or more amino groups at the time of cross-linking, but, for example, an aliphatic polyvalent amine compound, aromatic polyvalent amine compound, etc. may be mentioned.

As the aliphatic polyvalent amine compound, hexamethylenediamine, hexamethylenediamine carbamate, N,N'-dicinnamylidene-1,6-hexanediamine, or other compound which has two amino groups (including ones which become form of amino groups at time of cross-linking); polyallylamine, polyethyleneimine, polypropyleneimine, polybutadieneimine, or other polymer compound which has a plurality of amino groups (including ones which become form of amino groups at time of cross-linking); may be mentioned. These may be used as single types or as pluralities of types combined.

Further, as the aromatic polyvalent amine compound, 4,4'-methylenedianiline, m-phenylenediamine, 4,4'-diaminodiphenylether, 3,4'-diaminodiphenylether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide, 4,4'-bis(4-aminophenoxy)biphenyl, m-xylenediamine, p-xylenediamine, 1,3,5-benzenetriamine, etc. may be mentioned. These may be used as single type or as pluralities of types combined.

Among these as well, from the viewpoint of the high effect of improvement of the mechanical strength, abrasion resistance, and waterproofness when used as a binder, hexamethylenediamine carbamate, polyallylamine, and polyethyleneimine are preferable, while polyethyleneimine is particularly preferable.

The polyallylamine is a polymer which contains units of the following general formula (1).

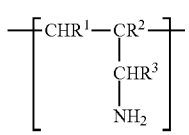
(1)

In the above general formula (1), $R^1$, $R^2$, and $R^3$ respectively independently are one selected from a group comprised of a hydrogen atom, alkyl group containing 1 to 4 carbon atoms which may have substituents, aryl group containing 6 to 12 carbon atoms which may have substituents, and halogen atom. Preferably, among $R^1$, $R^2$, and $R^3$, at least one is a hydrogen atom, particularly preferably all of $R^1$, $R^2$, and $R^3$ are hydrogen atoms.

Note that, the polyallylamine may be one which has units expressed by the general formula (1). For example, it may be a homopolymer of the allylamine-based monomer expressed by the following general formula (2) or a block polymer or random polymer of the allylamine-based monomer expressed by the following general formula (2) and a monomer which can copolymerize with this, but from the view of the larger effect of addition, a homopolymer of an allylamine-based monomer or a block polymer of an allylamine-based monomer and a copolymerizable monomer is preferable. That is, as the polyallylamine, one which contains a polymer (block) of the following general formula (3) is preferable.

(2)

(in the general formula (2), $R^1$, $R^2$, and $R^3$ are similar to the above general formula (1))

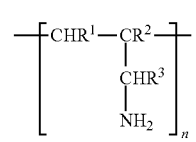
(3)

In the above general formula (3), $R^1$, $R^2$, and $R^3$ are similar to the general formula (1) and, in the same way as the general formula (1), all of $R^1$, $R^2$, and $R^3$ are particularly preferably hydrogen atoms. That is, as a polyallylamine, one containing a polymer (block) of the following general formula (4) is particularly preferable.

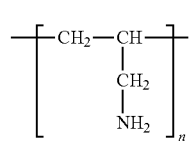
(4)

In the general formula (3) and general formula (4), "n" is an integer of 5 to 1000000, preferably 5 to 100000, more preferably 10 to 10000, particularly preferably 15 to 1000.

The weight average molecular weight (Mw) of the polyallylamine is not particularly limited, but from the viewpoint of being able to suitably obtain the effect of improvement of the mechanical strength, Abrasion resistance, and waterproofness, it is preferably 300 to 60,000,000, more preferably 300 to 6,000,000, furthermore preferably 600 to 600,000, particularly preferably 800 to 60,000.

Further, as the polyallylamine, one where the ratio of content of the units of the above general formula (1) is 50 wt % or more is preferable, while 70 wt % or more is more preferable, while one where the ratio of content of the units of the above general formula (1) is 100 wt % is particularly preferable.

The polyallylamine is, for example, produced by polymerizing the allylamine-based monomer of the above general formula (2), in accordance with need, in the copresence of a monomer which can copolymerize with the allylamine-based monomer, by the method which is disclosed in Japanese Patent Publication No. 2-14364B2, Japanese Patent Publication No. 2001-253905A, Japanese Patent Publication No. 2010-47688A, etc.

As the allylamine-based monomer, monoallylamine (same as 2-propen-1-amine), 3-methyl-2-propen-1-amine, 3-ethyl-2-propen-1-amine, 3-butyl-2-propen-1-amine, 3-phenyl-2-propen-1-amine, 3-tolyl-2-propen-1-amine, 3-chloro-2-propen-1-amine, 3-bromo-2-propen-1-amine, 2-methyl-2-propen-1-amine, 2-ethyl-2-propen-1-amine, 2-butyl-2-propen-1-amine, 2-phenyl-2-propen-1-amine, 2-tolyl-2-propen-1-amine, 2-chloro-2-propen-1-amine, 2-bromo-2-propen-1-amine. etc. may be mentioned, but since the effect of the present invention becomes much more remarkable, monoallylamine is preferable.

As the monomer which can copolymerize with an allylamine-based monomer, vinyl pyrrolidone, p-methacryloyloxyethyltrimethylammonium chloride, dimethylaminoethyl methacrylate, methylvinyl ketone, acrylamide, acrylonitrile, methacrylonitrile, styrene, hydroxyethyl acrylate, acrylic acid, methacrylic acid, vinyl chloride, vinyl isocyanate, methylvinyl ether, vinyl pyridine, acrolein, methyl acrylate, methyl methacrylate, etc. may be mentioned.

Further, polyethyleneimine is a polymer which is obtained by polymerization of the ethyleneimine of the following formula (5) and is a polymer which has a branched structure and primary to tertiary amino groups. It is usually a polymer which has structures of the following general formula (6).

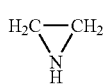

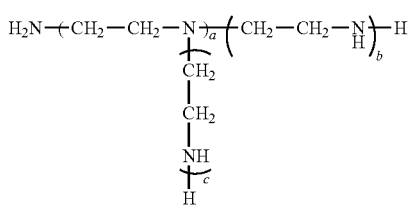

(in the above general formula (6), "a", "b", and "c" respectively independently are 0 or positive integers. However, at least one of "a", "b", or "c" is a positive integer.)

Note that, the polyethyleneimine typically is one which has the structure of the above general formula (6), but may also be one wherein in the above general formula (6), still another branched chain in formed by a manner substituting the nitrogen atoms in the branched chain (that is, the nitrogen atoms which are contained in the repeating units in which the number of repeating units is "c".) or may also be one in which still another branched chain is formed. Furthermore, it may also be one in which a plurality of branched chains are sequentially formed from this other branched chain. That is, the polyethyleneimine may be one which has a large number of branched structures. Further, in the present invention, as the polyethyleneimine, a copolymer obtained by copolymerizing an ethyleneimine of the above formula (5) and another monomer which can copolymerize with this, or one obtained by modifying this by various modifying agents may be used.

Further, in the above general formula (6), the repeating units in which the number of repeating units is "a" and the repeating units in which the number of repeating units is "b" are usually arranged randomly with each other.

The weight average molecular weight (Mw) of the polyethyleneimine is not particularly limited, but from the viewpoint of suitably obtaining the effect of improvement of the mechanical strength, abrasion resistance, and waterproofness, it is preferably 100 to 1,000,000, more preferably 100 to 100,000, furthermore preferably 150 to 50,000, particularly preferably 150 to 5,000.

In the adhesive composition of the present invention, the content of the polyvalent amine compound (B) is preferably 0.001 to 100 parts by weight with respect to 100 parts by weight of the highly saturated nitrile rubber (A), more preferably 0.01 to 80 parts by weight, furthermore preferably 0.1 to 40 parts by weight, particularly preferably 0.2 to 10 parts by weight. If the content of the polyvalent amine compound (B) is excessively large, the obtained cured adhesive layer is liable to end up falling in flexibility. Further, if excessively small, the obtained cured adhesive layer is liable to end up deteriorating in mechanical strength and abrasion resistance.

Fiber Base Material-Highly Saturated Nitrile Rubber Composite

As the composite which is obtained by bonding by the adhesive composition of the present invention, for example, a fiber base material-highly saturated nitrile rubber composite which is comprised of a fiber base material and highly saturated nitrile rubber may be mentioned. Such a fiber base material-highly saturated nitrile rubber composite usually can be obtained by bonding a fiber base material and a highly saturated nitrile rubber by the above-mentioned adhesive composition of the present invention.

The form of the fiber base material-highly saturated nitrile rubber composite is not particularly limited, but one which is comprised of the fiber base material and the highly saturated nitrile rubber bonded together, one which is comprised of the highly saturated nitrile rubber in which part or all of the fiber base material is embedded, etc. may be mentioned.

The type of the fiber which forms the fiber base material is not particularly limited, but as a specific example, polyester fiber, Nylon fiber, vinylon fiber, aramide (aromatic polyamide) fiber, glass fiber, cotton, rayon fiber, etc. may be mentioned.

The form of the fiber base material is not particularly limited. As specific examples, filaments, staple fibers, cords, ropes, woven fabric (sailcloth etc.) etc. may be mentioned. These may be suitably selected in accordance with the application of the fiber base material-highly saturated nitrile rubber composite. For example, it is possible to use a fiber base material in a cord form to obtain a toothed belt made of highly saturated nitrile rubber containing cores. Further, it is possible to use a sailcloth or other base cloth fiber base material to obtain a toothed belt made of highly saturated nitrile rubber covered by the base material.

The highly saturated nitrile rubber for forming a composite with a fiber base material which is used for a fiber base material-highly saturated nitrile rubber composite (below, to differentiate it from the above-mentioned highly saturated nitrile rubber (A) which forms the adhesive composition, referred to as the "highly saturated nitrile rubber (C)") is a copolymer which is obtained by copolymerizing a conjugated diene and α,β-ethylenically unsaturated nitrile as essential ingredient monomers and, as desired, a monomer which can copolymerize with these and hydrogenating the copolymer in accordance with need.

As the copolymerizable monomers, ones similar to the "α,β-ethylenically unsaturated dicarboxylic acid monoester monomer" or "other copolymerizable monomers" which are used for synthesis of the highly saturated nitrile rubber (A) which forms part of the above-mentioned adhesive composition may be mentioned.

Note that, the "highly saturated nitrile rubber (C)" may also be a highly saturated nitrile rubber of the same composition as the "highly saturated nitrile rubber (A)".

As specific examples of the highly saturated nitrile rubber (C), a highly saturated butadiene-acrylonitrile copolymer rubber, carboxyl group-containing highly saturated butadiene-acrylonitrile copolymer rubber, highly saturated isoprene-butadiene-acrylonitrile copolymer rubber, highly saturated isoprene-acrylonitrile copolymer rubber, highly saturated butadiene-methyl acrylate-acrylonitrile copolymer rubber, highly saturated butadiene-acrylic acid-acrylonitrile copolymer rubber, highly saturated butadiene-ethylene-acrylonitrile copolymer rubber, etc. may be mentioned.

Among these, in particular, as the highly saturated nitrile rubber (C) for a fiber base material-highly saturated nitrile rubber composite which is used for automobile applications, from the viewpoint of the oil resistance and heat resistance, a highly saturated butadiene-acrylonitrile copolymer rubber is preferable.

The highly saturated nitrile rubber (C) has a hydrogenation rate of an iodine value of 120 or less, preferably 100 or less, more preferably 50 or less. If the iodine value is too high, the obtained fiber base material-highly saturated nitrile rubber composite is liable to fall in heat resistance.

The content of the acrylonitrile monomer units of the highly saturated nitrile rubber (C) is preferably 10 to 60 wt %, more preferably 15 to 50 wt %, particularly preferably 20 to 50 wt %. If the content of the acrylonitrile monomer units is too small, the fiber base material-highly saturated nitrile rubber composite is liable to be inferior in oil resistance, while conversely if too great, the cold resistance may fall.

Further, the highly saturated nitrile rubber (C) has a Mooney viscosity ($ML_{1+4}$, 100° C.) of preferably 10 to 300, more preferably 20 to 250, particularly preferably 30 to 200. If the Mooney viscosity is too small, the shapeability and the mechanical properties are liable to fall, while if too great, the shapeability may fall.

The highly saturated nitrile rubber (C) may have suitably added to it sulfur, a peroxide-based cross-linking agent, polyamine cross-linking agent, or other cross-linking agent and also additives which are normally blended in at the time of rubber processing such as carbon black, silica, staple fibers, or other reinforcing agents; an antiaging agent; plasticizer; pigment; tackifier; work aid; scorch preventing agent; or other compounding agents.

The method of obtaining the fiber base material-highly saturated nitrile rubber composite is not particularly limited, but, for example, the method of using immersion etc. to deposit the adhesive composition of the present invention on the fiber base material, placing the fiber base material on which the adhesive composition of the present invention is deposited on the highly saturated nitrile rubber (C), and heating and pressing the same may be mentioned.

The pressing can be performed using a compression (press) molding machine, metal roll, injection molding machine, etc.

The pressure of the pressing operation is preferably 0.5 to 20 MPa, more preferably 2 to 10 MPa, the temperature of the heating is preferably 130 to 300° C., more preferably 150 to 250° C., and the operation time is preferably 1 to 180 minutes, more preferably 5 to 120 minutes.

Due to this method, the vulcanization and shaping of the highly saturated nitrile rubber (C) and the bonding between the fiber base material and the highly saturated nitrile rubber (C) can be simultaneously performed.

Note that, at the inside surface of the mold of the press or the surface of the roll, a mold for realizing the desired surface shape of the highly saturated nitrile rubber (C) of the targeted fiber base material-highly saturated nitrile rubber composite may be formed.

Further, as one embodiment of the fiber base material-highly saturated nitrile rubber composite, a fiber base material-highly saturated nitrile rubber-fiber base material composite may be mentioned.

A fiber base material-highly saturated nitrile rubber-fiber base material composite is, for example, comprised of a fiber base material (may be composite of two or more types of fiber base materials) and a fiber base material-highly saturated nitrile rubber composite combined.

Specifically, a fiber base material constituted by core yarn, highly saturated nitrile rubber (C), and fiber base material constituted by a base fabric may be superposed (at this time, the core yarn and base fabric may have the adhesive composition of the present invention suitably deposited on them) and heated while pressed to obtain a fiber base material-highly saturated nitrile rubber-fiber base material composite.

The fiber base material-highly saturated nitrile rubber composite which is obtained by bonding by the adhesive composition of the present invention are excellent in mechanical strength, abrasion resistance, and waterproofness.

For this reason, this is preferable for use for flat belts, V-belts, V-ribbed belts, round belts, square belts, toothed belts, or other belts and is particularly suitable for oil immersed belts.

Further, the fiber base material-highly saturated nitrile rubber composite which is obtained by bonding by the adhesive composition of the present invention may be suitably used for hoses, tubes, diaphragms, etc.

As the hose, a single-tube rubber hose, multilayer rubber hose, knitted reinforced hose, cloth-wrapped reinforced hose, etc. may be mentioned. As the diaphragm, a flat diaphragm, rolling diaphragm, etc. may be mentioned.

The fiber base material-highly saturated nitrile rubber composite which is obtained by bonding by the adhesive composition of the present invention can be used not only for the above applications, but also as seals, rubber rolls, or other industrial products. As seals, rotary, rocking, reciprocally moving, and other moving position seals and fixed position seals may be mentioned. As moving position seals, an oil seal, piston seal, mechanical seal, boot, dust cover, diaphragm, accumulator, etc. may be mentioned. As fixed position seals, an O-ring, various gaskets, etc. may be mentioned.

As the rubber rolls, rolls of parts of printers, copiers, and other OA equipment; spinning use stretching rolls, spinning use draft rolls, or other textile processing rolls; bridle rolls, snapper rolls, steering rolls, or other ironmaking rolls; etc. may be mentioned.

EXAMPLES

Below, examples will be given to explain the present invention in detail. Note that, the "parts" are based on weight unless otherwise indicated.

Further, the tests and evaluations were conducted by the following method.

Analysis of Composition of Rubber Contained in Highly Saturated Nitrile Rubber Latex The ratios of content of the monomer units of the highly saturated nitrile rubber which are contained in highly saturated nitrile rubber latex were measured by the following method.

First, an excess amount of methanol was added to a highly saturated nitrile rubber latex, the precipitated rubber was taken out, this was stirred and washed by methanol several times, and the result was dried under reduced pressure at 60° C. for 24 hours to obtain highly saturated nitrile rubber. The ratios of contents of the monomer units which form the highly saturated nitrile rubber which was obtained in this way were measured by the following method.

That is, the ratios of content of the mono n-butyl maleate units and methacrylic acid units were measured by the following method. First, to 2 mm square pieces of highly saturated nitrile rubber 0.2 g, 2-butanone 100 ml was added and stirred for 16 hours to dissolve the rubber, then ethanol 20 ml and water 10 ml were added. While stirring, a water-containing ethanol solution containing 0.02N of potassium hydroxide was used for titration at room temperature using Thymol Phthalein as an indicator. Next, from the results of the titration, the number of moles of the carboxyl groups with respect to the highly saturated nitrile rubber 100 g was found. The found number of moles was converted to the amount of mono n-butyl maleate units or methacrylic acid units.

The ratio of content of the acrylonitrile units was measured in accordance with JIS K6383 by measuring the content of nitrogen in the highly saturated nitrile rubber by the Kjeldahl method.

The ratio of content of the 1,3-butadiene units (including hydrogenated parts) was calculated by adding an excess amount of methanol in the same way as the above to nitrile rubber latex before the hydrogenation reaction and washing and drying the precipitated rubber to obtain the nitrile rubber before the hydrogenation reaction and measuring the iodine value (by JIS K 6235).

Furthermore, the ratios of content of the n-butyl acrylate units and methoxyethyl acrylate units were found by calculation as the remaining contents of the total contents of the acrylonitrile units, 1,3-butadiene units, and mono n-butyl maleate units which were found from the above measurement values.

Iodine Value

The iodine value was measured based on JIS K 6235 using highly saturated nitrile rubber which is obtained by a method similar to the case of the above analysis of the composition of the rubber.

Normal Physical Properties (Tensile Strength, Stress, and Elongation) of Cured Film of Adhesive Composition The adhesive composition was poured into a vertical 23 cm, horizontal 16 cm glass mold and dried at 20° C. for 96 hours, then was peeled off from the mold to obtain a thickness 0.5 mm film. This film was heat treated at 170° C. for 20 minutes to obtain a cured film of the adhesive composition.

Next, the obtained cured film was punched out to a No. 3 dumbbell shape to prepare a test piece. This test piece was used to perform a tensile test based on. JIS K6251 by a tensile speed of 300 mm/min and measure the cured film for tensile strength, tensile stress, and elongation.

Waterproofness Test of Cured Film of Adhesive Composition

The same procedure was followed as the case of the above normal physical properties to obtain a cured film of an adhesive composition.

The obtained cured film was cut to a vertical 3 cm, horizontal 2 cm size and immersed in 90° C. distilled water for 72 hours to measure the volume swell ΔV before and after immersion in water.

Note that, the volume swell ΔV (unit: %) was calculated by measuring the volume of the cured film before and after immersion in water and solving "ΔV=([Volume after immersion in water]−[Volume before immersion in water])/([Volume before immersion in water])×100".

The smaller the absolute value of this volume swell ΔV, the better the waterproofness.

Abrasion Resistance Test of Fiber Base Material-Highly Saturated Nitrile Rubber Composite The composite of a fiber base material constituted by a vertical 15 cm, horizontal 15 cm Nylon base fabric and highly saturated nitrile rubber was evaluated for the abrasion resistance using a carpet use Taber abrasion tester (product name "Taber Abraser 5150", made by Taledyne Taber) and rubbing the Nylon base fabric side by a disk. The test conditions were a load of 1 kg, an abrasion surface temperature of 120° C. (irradiation by infrared lamp), disk rotational speed of 10,000.

Further, the abrasion resistance was evaluated by the following criteria by five stages of abrasion loss at the Nylon base fabric side.

5: surface of nylon base fabric side normal (abrasion loss less than 1%)
4: nylon base fabric side abraded by 1% to less than 25%
3: nylon base fabric side abraded by 25% to less than 50%
2: nylon base fabric side abraded by 50% to less than 75%
1: nylon base fabric side abraded by 75% or more Synthesis Example 1

To a reactor, ion exchanged water 180 parts, a concentration 10 wt % sodium dodecyl benzenesulfonate aqueous solution 25 parts, acrylonitrile 37 parts, mono n-butyl maleate 4 parts, and t-dodecyl mercaptan (molecular weight adjuster) 0.5 part were charged in that order. The inside gas was replaced with nitrogen 3 times, then 1,3-butadiene 57 parts was charged. Next, the reactor was held at 5° C., cumene hydroperoxide (polymerization initiator) 0.1 part was charged, the mixture was stirred while continuing the polymerization reaction, then when the polymerization conversion rate became 40% and 60%, 1 part amounts of mono n-butyl maleate were added respectively. When the polymerization conversion rate became 85%, a concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X1) (solid content concentration about 30 wt %).

Further, to give a content of palladium with respect to the dry weight of the rubber which is contained in the above obtained latex of the nitrile rubber (X1) of 1,000 wt ppm, the latex of nitrile rubber (X1) and a palladium catalyst (solution obtained by mixing 1 wt % palladium acetate acetone solution and an equivalent weight of ion exchanged water) were added in an autoclave, a hydrogenation reaction was performed at a hydrogen pressure of 3 MPa and a temperature of 50° C. for 6 hours, and the solid content concentration was adjusted to obtain a latex (L1-1) of highly saturated nitrile rubber (A1-1) (solid content concentration 30 wt %).

The ratios of content of the monomer units of the highly saturated nitrile rubber (A1-1) were acrylonitrile units 35.7 wt %, mono n-butyl maleate units 5.7 wt %, and 1,3-butadiene units (including hydrogenated parts) 58.6 wt %. Further, the iodine value was 9.

Synthesis Example 2

In Synthesis Example 1, except for changing the amount of addition of the palladium catalyst to give a palladium content of 700 wt ppm with respect to the dry weight of the rubber which is contained in the latex of the nitrile rubber (X1) at the time of performing a hydrogenation reaction, the same procedure was followed as in Synthesis Example 1 to obtain a latex (L1-2) of the highly saturated nitrile rubber (A1-2) (solid content concentration 30 wt %).

The ratios of content of the monomer units of the highly saturated nitrile rubber (A1-2) were acrylonitrile units 35.7 wt %, mono n-butyl maleate units 5.7 wt %, and 1,3-butadiene units (including hydrogenated parts) 58.6 wt %. Further, the iodine value was 30.

Synthesis Example 3

In Synthesis Example 1, except for changing the amount of addition of the palladium catalyst to give a palladium content of 50 wt ppm with respect to the dry weight of the rubber which is contained in the latex of the nitrile rubber (X1) at the time of performing a hydrogenation reaction, the same procedure was followed as in Synthesis Example 1 to obtain a latex (L1-3) of the highly saturated nitrile rubber (A1-3) (solid content concentration 30 wt %).

The ratios of content of the monomer units of the highly saturated nitrile rubber (A1-3) were acrylonitrile units 35.7 wt %, mono n-butyl maleate units 5.7 wt %, and 1,3-butadiene units (including hydrogenated parts) 58.6 wt %. Further, the iodine value was 119.

Synthesis Example 4

To a reactor, ion exchanged water 180 parts, a concentration 10 wt % sodium dodecyl benzenesulfonate aqueous solution 25 parts, acrylonitrile 15 parts, mono n-butyl maleate 6 parts, n-butyl acrylate 39 parts and t-dodecyl mercaptan (molecular weight adjuster) 0.5 part were charged in that order. The inside gas was replaced with nitrogen 3 times, then 1,3-butadiene 40 parts was charged. Next, the reactor was held at 5° C., cumene hydroperoxide (polymerization initiator) 0.1 part was charged, the mixture was stirred while continuing the polymerization reaction, then when the polymerization conversion rate became 85%, a concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X2) (solid content concentration about 30 wt %).

Further, to give a content of palladium of 1,000 wt ppm with respect to the dry weight of the rubber which is contained in the above obtained latex of the nitrile rubber (X2), the latex of nitrile rubber (X2) and a palladium catalyst (solution obtained by mixing 1 wt % palladium acetate acetone solution and an equivalent weight of ion exchanged water) were added in an autoclave, a hydrogenation reaction was performed at a hydrogen pressure of 3 MPa and a temperature of 50° C. for 6 hours, and the solid content concentration was adjusted to obtain a latex (L2) of highly saturated nitrile rubber (A2) (solid content concentration 30 wt %).

The ratios of content of the monomers of the highly saturated nitrile rubber (A2) were acrylonitrile units 15.0 wt %, mono n-butyl maleate units 5.0 wt %, n-butyl acrylate units 35.0 wt %, and 1,3-butadiene units (including hydrogenated parts) 45.0 wt %. Further, the iodine value was 10.

Synthesis Example 5

To a reactor, ion exchanged water 180 parts, a concentration 10 wt % sodium dodecyl benzenesulfonate aqueous solution 25 parts, acrylonitrile 20 parts, mono n-butyl maleate 4.5 parts, methoxyethyl acrylate 35.5 parts, and t-dodecyl mercaptan (molecular weight adjuster) 0.5 part were charged in that order. The inside gas was replaced with nitrogen 3 times, then 1,3-butadiene 40 parts was charged. Next, the reactor was held at 5° C., cumene hydroperoxide (polymerization initiator) 0.1 part was charged, the mixture was stirred while continuing the polymerization reaction, then when the polymerization conversion rate became 83%, a concentration 10 wt % hydroquinone aqueous solution (polymerization terminator) 0.1 part was added to stop the polymerization reaction. Next, the residual monomers were removed at a water temperature of 60° C. to obtain a latex of nitrile rubber (X3) (solid content concentration about 30 wt %).

Further, to give a content of palladium of 1,000 wt ppm with respect to the dry weight of the rubber which is contained in the above obtained latex of the nitrile rubber (X3), the latex of nitrile rubber (X3) and a palladium catalyst (solution obtained by mixing 1 wt % palladium acetate acetone solution and an equivalent weight of ion exchanged water) were added in an autoclave, a hydrogenation reaction was performed at a hydrogen pressure of 3 MPa and a temperature of 50° C. for 6 hours, and the solid content concentration was adjusted to obtain a latex (L3) of highly saturated nitrile rubber (A3) (solid content concentration 30 wt %).

The ratios of content of the monomers of the highly saturated nitrile rubber (A3) were acrylonitrile units 21.3 wt %, mono n-butyl maleate units 5.0 wt %, methoxyethyl acrylate units 27.1 wt %, and 1,3-butadiene units (including hydrogenated parts) 46.6 wt %. Further, the iodine value was 10.

Synthesis Example 6

To distilled water 90 parts by weight, an aliphatic polyvalent amine compound constituted by hexamethylenediamine carbamate (product name "Diak#1", made by Dupont Dow Elastomer) 10 parts by weight was added and the mixture stirred at room temperature for 1 hour to obtain the polyvalent amine aqueous solution (Y1).

Synthesis Example 7

To distilled water 50 parts by weight, an aliphatic polyvalent amine compound constituted by an aqueous solution of polyallylamine (product name "Polyallylamine PAA-01", made by Nitto Boseki, polymer comprised of units of above general formula (4), weight average molecular weight (Mw) 1,600, 15 wt % aqueous solution) 100 parts by weight was added and the mixture stirred at room temperature for 1 hour to obtain the polyvalent amine aqueous solution (Y2).

Synthesis Example 8

To distilled water 90 parts by weight, an aliphatic polyvalent amine compound constituted by polyethyleneimine (product name "Polyethyleneimine PEI300", made by Junsei Chemical, weight average molecular weight (Mw) 300, amine value 21) 10 parts by weight was added and the mixture stirred at room temperature for 1 hour to obtain the polyvalent amine aqueous solution (Y3).

Synthesis Example 9

Resorcin 11 parts, formalin (37 wt % concentration) 8.1 parts, and sodium hydroxide (10 wt % concentration) 3 parts were dissolved in distilled water 194 parts and stirred at room temperature for 20 hours to obtain a resorcin-formaldehyde resin solution (RF1).

Example 1

To the latex (L1-1) of highly saturated nitrile rubber (A1-1) which was obtained at Synthesis Example 1 (solid content concentration 30 wt %) 53.3 parts (converted to highly saturated nitrile rubber (A1-1), 16 parts), a polyvalent amine aqueous solution (Y1) which was obtained in Synthesis Example 6, 4.2 parts (converted to hexamethylenediamine carbamate, 0.42 part) and distilled water 30.1 parts were added and the mixture stirred at room temperature for 1 minute to obtain an adhesive composition (LS1).

Further, the obtained adhesive composition (LS1) was used to evaluate the "normal physical properties of cured film of adhesive composition (tensile strength, stress, elongation)" and conduct the "waterproofness test of cured film of adhesive composition". The results are shown in Table 1.

Example 2

Except for using, instead of the latex (L1-1) of the highly saturated nitrile rubber (A1-1), the latex (L1-2) of the highly saturated nitrile rubber (A1-2) which was obtained in Synthesis Example 2 (solid content concentration 30 wt %), the same procedure was followed as in Example 1 to obtain an adhesive composition (LS2). Further, the obtained adhesive composition (LS2) was used to evaluate it in the same way as Example 1. The results are shown in Table 1.

Example 3

Except for using, instead of the latex (L1-1) of the highly saturated nitrile rubber (A1-1), the latex (L1-3) of the highly saturated nitrile rubber (A1-3) which was obtained in Synthesis Example 3 (solid content concentration 30 wt %), the same procedure was followed as in Example 1 to obtain an adhesive composition (LS3) and the same procedure was followed to evaluate it. The results are shown in Table 1.

Example 4

Except for using, instead of the polyvalent amine aqueous solution (Y1) 4.2 parts, the polyvalent amine aqueous solution (Y2) which was obtained in Synthesis Example 7, 3.0 parts (converted to polyallylamine, 0.3 part), the same procedure was followed as in Example 1 to obtain an adhesive composition (LS4) and the same procedure was followed to evaluate it. The results are shown in Table 1.

Example 5

Except for using, instead of the polyvalent amine aqueous solution (Y1) 4.2 parts, the polyvalent amine aqueous solution (Y3) which was obtained in Synthesis Example 8, 5.3 parts (converted to polyethyleneimine, 0.53 part), the same procedure was followed as in Example 1 to obtain an adhesive composition (LS5) and the same procedure was followed to evaluate it. The results are shown in Table 1.

Example 6

Except for using, instead of the latex (L1-1) of the highly saturated nitrile rubber (A1-1), the latex (L2) of the highly saturated nitrile rubber (A2) which was obtained in Synthesis Example 4 (solid content concentration 30 wt %), the same procedure was followed as in Example 1 to obtain an adhesive composition (LS6) and the same procedure was followed to evaluate it. The results are shown in Table 1.

Example 7

Except for using, instead of the polyvalent amine aqueous solution (Y1) 4.2 parts, the polyvalent amine aqueous solution (Y2) which was obtained in Synthesis Example 7, 3.0 parts (converted to polyallylamine, 0.3 part), the same procedure was followed as in Example 6 to obtain an adhesive composition (LS7) and the same procedure was followed to evaluate it. The results are shown in Table 1.

Example 8

Except for using, instead of the polyvalent amine aqueous solution (Y1) 4.2 parts, the polyvalent amine aqueous solution (Y3) which was obtained in Synthesis Example 8, 5.3 parts (converted to polyethyleneimine, 0.53 part), the same procedure was followed as in Example 6 to obtain an adhesive composition (LS8) and the same procedure was followed to evaluate it. The results are shown in Table 1.

Example 9

Except for using, instead of the latex (L1-1) of the highly saturated nitrile rubber (A1-1), the latex (L3) of the highly saturated nitrile rubber (A3) which was obtained in Synthesis Example 5 (solid content concentration 30 wt %), the same procedure was followed as in Example 1 to obtain an adhesive composition (LS9) and the same procedure was followed to evaluate it. The results are shown in Table 1.

Example 10

Except for using, instead of the polyvalent amine aqueous solution (Y1) 4.2 parts, the polyvalent amine aqueous solution (Y2) which was obtained in Synthesis Example 7, 3.0 parts (converted to polyallylamine, 0.3 part), the same procedure was followed as in Example 9 to obtain an adhesive composition (LS10) and the same procedure was followed to evaluate it. The results are shown in Table 1.

Example 11

Except for using, instead of the polyvalent amine aqueous solution (Y1) 4.2 parts, a polyvalent amine aqueous solution (Y3) which was obtained in Synthesis Example 8, 5.3 parts (converted to polyethyleneimine, 0.53 part), the same procedure was followed as in Example 9 to obtain an adhesive composition (LS11) and the same procedure was followed to evaluate it. The results are shown in Table 1.

Comparative Example 1

Except for using, instead of the polyvalent amine aqueous solution (Y1) 4.2 parts, the resorcin-formaldehyde resin solution (RF1) which was obtained in Synthesis Example 9, 24.2 parts (converted to resorcin-formaldehyde resin, 2.14 parts) and changing the amount of distilled water from 30.1 parts to 10.0 parts, the same procedure was followed as in Example 1 to obtain an adhesive composition (LC1) and the same procedure was followed to evaluate it. The results are shown in Table 1.

Comparative Example 2

Except for using, instead of the latex (L1-1) of the highly saturated nitrile rubber (A1-1), the latex (L2) of the highly saturated nitrile rubber (A2) which was obtained in Synthesis Example 4 (solid content concentration 30 wt %), the same procedure was followed as in Comparative Example 1 to obtain an adhesive composition (LC2) and the same procedure was followed to evaluate it. The results are shown in Table 1.

Comparative Example 3

Except for using, instead of the latex (L1-1) of the highly saturated nitrile rubber (A1-1), the latex (L3) of the highly saturated nitrile rubber (A3) which was obtained in Synthesis Example 5 (solid content concentration 30 wt %), the same procedure was followed as in Comparative Example 1 to obtain an adhesive composition (LC3) and the same procedure was followed to evaluate it. The results are shown in Table 1.

TABLE 1

| | | | Example | | | | | | | |
|---|---|---|---|---|---|---|---|---|---|---|
| | | | 1 | 2 | 3 | 4 | 5 | 6 | 7 | 8 |
| Adhesive composition | | | LS1 | LS2 | LS3 | LS4 | LS5 | LS6 | LS7 | LS8 |
| Latex used | | | L1-1 | L1-2 | L1-3 | L1-1 | L1-1 | L2 | L2 | L2 |
| Highly saturated nitrile rubber in latex | | | A1-1 | A1-2 | A1-3 | A1-1 | A1-1 | A2 | A2 | A2 |
| Iodine value of highly saturated nitrile rubber | | | 9 | 30 | 119 | 9 | 9 | 10 | 10 | 10 |
| Composition of highly saturated nitrile rubber | Acrylonitrile unit | (wt %) | 35.7 | 35.7 | 35.7 | 35.7 | 35.7 | 15.0 | 15.0 | 15.0 |
| | 1,3-butadiene unit*) | (wt %) | 58.6 | 58.6 | 58.6 | 58.6 | 58.6 | 45.0 | 45.0 | 45.0 |
| | Mono-n-butyl maleate unit | (wt %) | 5.7 | 5.7 | 5.7 | 5.7 | 5.7 | 5.0 | 5.0 | 5.0 |
| | n-butyl acrylate unit | (wt %) | — | — | — | — | — | 35.0 | 35.0 | 35.0 |
| | Methoxyethyl acrylate unit | (wt %) | — | — | — | — | — | — | — | — |
| | Curing agent | | Hexaethylene diamine carbamate | Hexaethylene diamine carbamate | Hexaethylene diamine carbamate | Polyallyl amine | Polyethylene imine | Hexaethylene diamine carbamate | Polyallyl amine | Polyethylene imine |
| Normal physical properties | Tensile strength | (MPa) | 29.9 | 29.5 | 30.8 | 29.8 | 34.2 | 27.0 | 27.6 | 35.9 |
| | Elongation | (%) | 530 | 530 | 520 | 510 | 540 | 520 | 530 | 520 |
| | 100% stress | (MPa) | 4.2 | 4.3 | 4.5 | 5.0 | 6.1 | 3.9 | 4.1 | 6.3 |
| Waterproofness | Volume swelling degree ΔV | (%) | 19 | 22 | 38 | 17 | 10 | 18 | 20 | 9 |

| | | | Example | | | Comp. Ex | | |
|---|---|---|---|---|---|---|---|---|
| | | | 9 | 10 | 11 | 1 | 2 | 3 |
| Adhesive composition | | | LS9 | LS10 | LS11 | LC1 | LC2 | LC3 |
| Latex used | | | L3 | L3 | L3 | L1-1 | L2 | L3 |
| Highly saturated nitrile rubber in latex | | | A3 | A3 | A3 | A1-1 | A2 | A3 |
| Iodine value of highly saturated nitrile rubber | | | 10 | 10 | 10 | 9 | 10 | 10 |
| Composition of highly saturated nitrile rubber | Acrylonitrile unit | (wt %) | 21.3 | 21.3 | 21.3 | 35.7 | 15.0 | 21.3 |
| | 1,3-butadiene unit*) | (wt %) | 46.6 | 46.6 | 46.6 | 58.6 | 45.0 | 46.6 |
| | Mono-n-butyl maleate unit | (wt %) | 5.0 | 5.0 | 5.0 | 5.7 | 5.0 | 5.0 |
| | n-butyl acrylate unit | (wt %) | — | — | — | — | 35.0 | — |
| | Methoxyethyl acrylate unit | (wt %) | 27.1 | 27.1 | 27.1 | — | — | 27.1 |
| | Curing agent | | Hexaethylene diamine carbamate | Polyallyl amine | Polyethylene imine | Resorcinformaldehyde resin | Resorcinformaldehyde resin | Resorcinformaldehyde resin |
| Normal physical properties | Tensile strength | (MPa) | 28.0 | 28.5 | 34.1 | 22.0 | 16.0 | 18.0 |
| | Elongation | (%) | 530 | 530 | 520 | 500 | 450 | 460 |
| | 100% stress | (MPa) | 4.0 | 4.3 | 6.6 | 2.9 | 2.8 | 3.1 |
| Waterproofness | Volume swelling degree ΔV | (%) | 19 | 21 | 9 | 58 | 55 | 61 |

*)Including hydrogenated parts.

From Table 1, the cured films which were obtained from the adhesive composition of the present invention which contains a latex of a highly saturated nitrile rubber which has α,β-ethylenically unsaturated nitrile monomer units, conjugated diene monomer units, and α,β-ethylenically unsaturated dicarboxylic acid monoester monomer units in specific ratios and which has an iodine value of 120 or less and a polyvalent amine compound (corresponding to cured adhesive layer) were found to be excellent in normal physical properties (tensile strength, stress, and elongation) and excellent in waterproofness (Examples 1 to 11). In particular, in Examples 5, 8, and 11 in which polyvalent amine compounds (B) constituted by polyethyleneimine was used, the cured films were particularly low in volume swelling degree ΔV and were particularly excellent in waterproofness.

On the other hand, the cured films which were obtained from the adhesive composition obtained by using a resorcinformaldehyde resin instead of a polyvalent amine compound and therefore not satisfying the requirements of the present invention were found to be inferior in normal physical properties (tensile strength, stress, and elongation) and waterproofness (Comparative Examples 1 to 3).

Example 12

To the adhesive composition (LS1) which was obtained in Example 1, 400 parts, HAF carbon (product name "Seast 3", made by Tokai Carbon) in an aqueous dispersion (25 wt % concentration) 40 parts was added to obtain an HAF carbon mixture solution, then a base fabric (woven fabric) which is comprised of a fiber base material constituted by Nylon 66 was dipped in the HAF carbon mixture solution and pulled up to thereby coat the Nylon 66 base fabric with the adhesive composition. At this time, the rubber in the adhesive composition was deposited to 20 parts with respect to 100 parts of the Nylon 66 base fabric.

Next, the base fabric which was coated by the adhesive composition was heated in an air circulating type oven at 180° C. for 2 minutes to obtain a base fabric which was pretreated with an adhesive composition.

Further, according to the formulations A, B, C, D, and E which are described in Table 2, the ingredients were kneaded on rolls to obtain about 2.5 mm thickness sheet A, sheet B, sheet C, sheet D, and sheet E of cross-linkable highly saturated nitrile rubber compositions.

Further, each sheet of the cross-linkable highly saturated nitrile rubber composition was superposed on the above pretreated base fabric (planar shape of vertical 15 cm, horizontal 15 cm) and pressed by a press by a pressure of 5 MPa while holding it at 170° C. for 30 minutes for cross-linking to obtain a composite of a base fabric which is comprised of a fiber base material constituted by Nylon 66 and highly saturated nitrile rubber (composite obtained from sheet A, composite obtained from sheet B, composite obtained from sheet C, composite obtained from sheet D, and composite obtained from sheet E).

These composites were subjected to the "abrasion resistance test of fiber base material-highly saturated nitrile rubber composite". The results are shown in Table 3.

Examples 13 to 20 and Comparative Examples 4 to 6

Except for using, instead of the adhesive composition (LS1), the adhesive compositions (LS4) to (LS11) which were obtained in Examples 4 to 11 (Examples 13 to 20) and the adhesive compositions (LC1) to (LC3) which were obtained in Comparative Examples 1 to 3 (Comparative Examples 4 to 6), the same procedures were followed as in Example 12 to obtain composites.

Further, the obtained composites were subjected to the "abrasion resistance test of fiber base material-highly saturated nitrile rubber composite". The results are shown in Table 3.

From Table 3, composites of base fabrics and highly saturated nitrile rubber, that is, fiber base material-highly saturated nitrile rubber composites, which are fabricated by the adhesive composition of the present invention containing a latex of a highly saturated nitrile rubber which has α,β-ethylenically unsaturated nitrile monomer units, conjugated diene monomer units, and α,β-ethylenically unsaturated dicarboxylic acid monoester monomer units in specific ratios and which has an iodine value of 120 or less and a polyvalent amine compound were found to be excellent in abrasion resistance (Examples 12 to 20).

On the other hand, composites of base fabrics and highly saturated nitrile rubber which are fabricated by the adhesive composition obtained by using a resorcin-formaldehyde resin instead of a polyvalent amine compound and therefore not satisfying the requirements of the present invention were found to be inferior in abrasion resistance (Comparative Examples 4 to 6).

TABLE 2

| Formulation | | A | B | C | D | E |
|---|---|---|---|---|---|---|
| Zetpol 2020 (*1) | (parts) | 100 | — | — | 60 | — |
| Zetpol 2000 (*2) | (parts) | — | 100 | — | — | — |
| Zetpol 2001 (*3) | (parts) | — | — | 100 | — | — |
| ZSC 2295 (*4) | (parts) | — | — | — | 40 | — |
| Highly saturated nitrile rubber (A1-1) | (parts) | — | — | — | — | 100 |
| Zinc white | (parts) | 5 | 5 | 5 | 5 | — |
| Stearic acid | (parts) | 1 | 1 | 1 | 1 | 1 |
| SRF carbon black (*5) | (parts) | 40 | 40 | 40 | 30 | 40 |
| Sulfur (*6) | (parts) | 0.5 | — | — | — | — |
| Tetramethylthiuram disulfide | (parts) | 1.5 | — | — | — | — |
| 2-mercaptobenzothiazole | (parts) | 1.5 | — | — | — | — |
| Peroxymon F-40 (*7) | (parts) | — | 8 | 8 | 8 | — |
| 1,8-diazabicyclo[5,4,0]-undecene-7 (60% product) (*8) | (parts) | — | — | — | — | 4 |
| Hexamethylenediamine carbamate | (parts) | — | — | — | — | 2.6 |

(*1) Highly saturated nitrile rubber: iodine value 28, acrylonitrile monomer units 36 wt % (made by Zeon Corporation)
(*2) Highly saturated nitrile rubber: iodine value 7 or less, acrylonitrile monomer units 36 wt % (made by Zeon Corporation)
(*3) Highly saturated nitrile rubber: iodine value 7 or less, acrylonitrile monomer units 40 wt % (made by Zeon Corporation)
(*4) Highly saturated nitrile rubber composition containing zinc dimethacrylate (made by Zeon Corporation)
(*5) Product name "Seast S" (made by Tokai Carbon)
(*6) Product name "Golden Flower Sulfur Powder (325 mesh)" (made by Tsurusmi Chemical)
(*7) Product name "Peroxymon F-40", organic peroxide cross-linking agent (made by NOF)
(*8) Product name "Rhenogran XLA-60 (GE2014)" (made by RheinChemie)

The invention claimed is:

1. An adhesive composition containing:
   a latex consisting essentially of: (i) a highly saturated nitrile rubber (A) which has α,β-ethylenically unsaturated nitrile monomer units 10 to 55 wt %, conjugated diene monomer units 25 to 89 wt %, α,β-ethylenically unsaturated dicarboxylic acid monoester monomer units 1 to 20 wt %, and the highly saturated nitrile rubber (A) has an iodine value of 120 or less, and (ii) water; and
   polyethyleneimine, wherein:
   a solid content in the latex is 5 to 60 wt %, and
   a content of the polyethyleneimine is 0.1 to 40 parts by weight with respect to 100 parts by weight of the highly saturated nitrile rubber (A).

2. The adhesive composition as set forth in claim 1, wherein the α,β-ethylenically unsaturated dicarboxylic acid monoester monomer units are α,β-ethylenically unsaturated dicarboxylic acid monoalkyl ester monomer units.

3. The adhesive composition as set forth in claim 2, wherein the α,β-ethylenically unsaturated dicarboxylic acid monoalkyl ester monomer units are mono-n-butyl maleate units.

4. The adhesive composition as set forth in claim 1, wherein the polyethyleneimine has a weight average molecular weight (Mw) of 100 to 1,000,000.

TABLE 3

| | Example | | | | | | | | | Comp. Ex. | | |
|---|---|---|---|---|---|---|---|---|---|---|---|---|
| | 12 | 13 | 14 | 15 | 16 | 17 | 18 | 19 | 20 | 4 | 5 | 6 |
| Adhesive composition | LS1 | LS4 | LS5 | LS6 | LS7 | LS8 | LS9 | LS10 | LS11 | LC1 | LC2 | LC3 |
| Adhesive composition | | | | | | | | | | | | |
| Composite using sheet made by formulation A | 4 | 4 | 5 | 5 | 4 | 5 | 5 | 5 | 5 | 3 | 2 | 3 |
| Composite using sheet made by formulation B | 5 | 5 | 5 | 5 | 4 | 5 | 4 | 4 | 5 | 3 | 2 | 2 |
| Composite using sheet made by formulation C | 5 | 5 | 5 | 5 | 5 | 5 | 5 | 5 | 5 | 3 | 3 | 3 |
| Composite using sheet made by formulation D | 5 | 5 | 5 | 4 | 4 | 5 | 5 | 5 | 5 | 3 | 2 | 2 |
| Composite using sheet made by formulation E | 5 | 5 | 5 | 5 | 4 | 5 | 5 | 5 | 5 | 3 | 3 | 3 |

5. The adhesive composition as set forth in claim 1, wherein the polyethyleneimine has a weight average molecular weight (Mw) of 100 to 5,000.

* * * * *